Jan. 6, 1931.   E. H. BURKE   1,787,894
WINDSHIELD WIPER SUPPORT
Filed Sept. 18, 1929   2 Sheets-Sheet 1
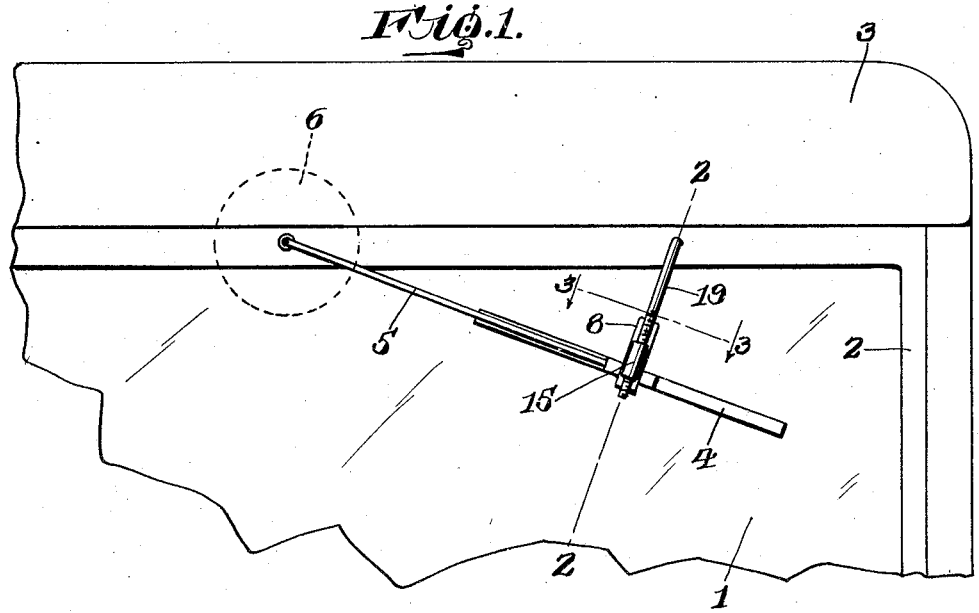
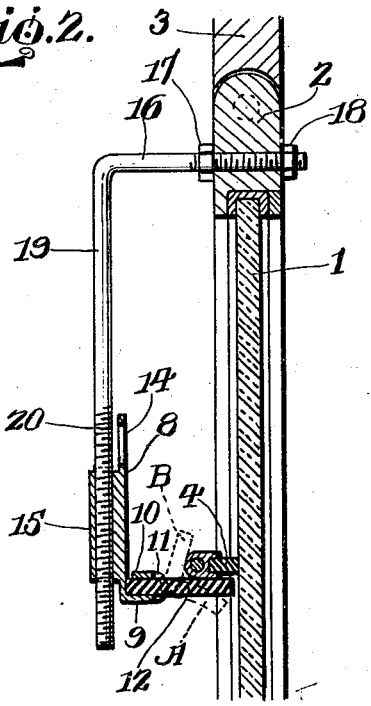
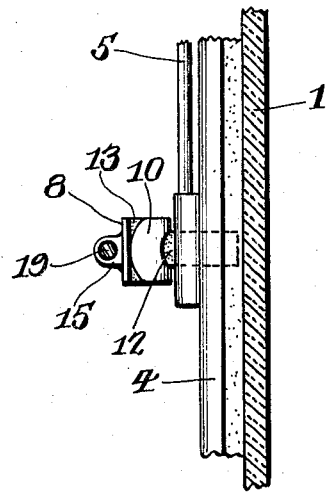
INVENTOR.
Edmund H. Burke,
BY
Geo. P. Kimmel
ATTORNEY.

Jan. 6, 1931.  E. H. BURKE  1,787,894
WINDSHIELD WIPER SUPPORT
Filed Sept. 18, 1929  2 Sheets-Sheet 2
Fig. 4.
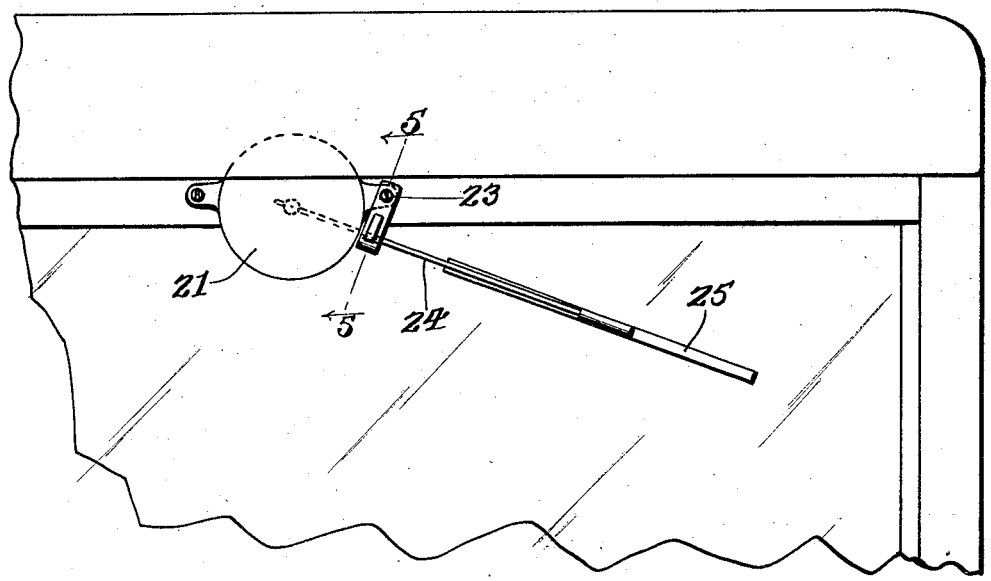
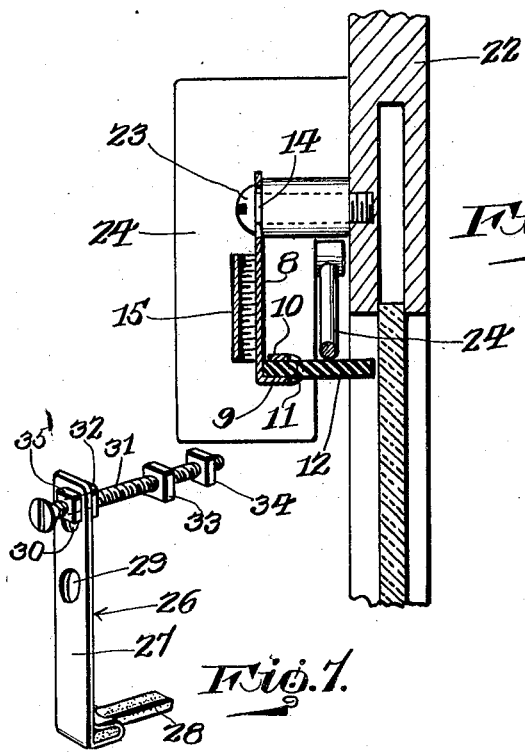
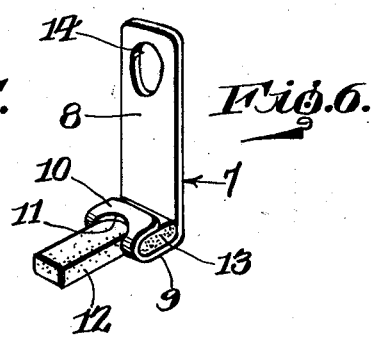
INVENTOR.
Edmund H. Burke,
BY
Geo. F. Kimmel
ATTORNEY.

Patented Jan. 6, 1931

1,787,894

UNITED STATES PATENT OFFICE

EDMUND H. BURKE, OF NORMAN, OKLAHOMA

WINDSHIELD-WIPER SUPPORT

Application filed September 18, 1929. Serial No. 393,536.

This invention relates to a windshield wiper support and has for one of its objects to provide, in a manner as hereinafter set forth, a device of such class by means of which a windshield wiper may be securely held adjacent the top of the windshield during such period that the wiper is not in active operation, thereby preventing the wiper from dropping into the line of vision of the driver of the vehicle with which the device is associated and relieving the wiper actuating motor from the weight of the wiper.

A further object of the invention is to provide a wiper support of the class aforesaid from which the wiper supported thereby may be automatically released upon starting the wiper actuating motor.

A further object of the invention is to provide a wiper support of the class aforesaid which may be installed in a few minutes in connection with windshields of both the swinging and sliding types.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the same:—

Figure 1 is a fragmentary elevation of a swinging type windshield equipped with a motor actuated wiper supported by means of my invention.

Figure 2 is a section taken on line 2—2 of Figure 1.

Figure 3 is a section taken on line 3—3 of Figure 1.

Figure 4 is a view similar to Figure 1 of a windshield of the sliding type equipped with a motor actuated wiper supported by my invention.

Figure 5 is a section taken on line 5—5 of Figure 4.

Figure 6 is a perspective view of my improved wiper support.

Figure 7 is a perspective view of a modified form of my wiper support.

Referring to the drawing in detail, with particular reference to Figures 1, 2, 3 and 6, the numeral 1 designates a windshield set in a windshield frame 2 pivotally supported on the frame 3 of a motor vehicle. Associated with the windshield is a wiper 4 which is carried by a rod 5 actuated by a motor 6 which may be of any well known design and which is mounted on the inner face of the windshield frame 2.

My invention resides in a wiper support indicated generally by the numeral 7, by means of which the wiper 4 may be supported when the motor 6 is not in operation. The support consists of an elongated body portion 8 which is preferably made of metal and which is offset at a right angle adjacent one end as indicated at 9 and formed with a returned portion 10 in parallel, spaced relation to the portion 9.

Formed at the bend between the portions 9 and 10 is an opening 11 through which the stem 12 of a substantially T-shaped element projects, the head 13 of which is clamped between the portions 9 and 10 of the member 8. The resilient element comprising the stem 12 and head 13 is preferably formed of rubber although any other suitable material may be used which possesses the desired degree of resiliency. The end of the member 8 which carries the resilient element will be designated as the lower end, and adjacent the upper end thereof, the member 8 is provided with an elongated opening 14. Extending longitudinally of the member 8 is an elongated boss 15 which is provided with an opening extending longitudinally therethrough and having a threaded wall.

When associated with a windshield of the swinging type, the support 7 is secured in position by means of a hanger having a horizontally disposed end portion 16 extending through a transverse opening formed in the windshield frame 2 and secured in position with respect to the frame 2 by means of a pair of nuts 17 and 18 threaded on the portion 16, the nuts respectively being disposed on opposite sides of the frame 2. The opposite end portion 19 of the hanger extends at a right angle to the portion 16 and is formed with external threads 20 for engagement with the threaded wall of the opening in the elongated boss 15.

When the motor 6 is not in operation, the wiper 4 is supported above its path of movement upon the resilient stem 12. Upon starting the motor 6, the stem 12 will be forced to the position indicated in dotted lines and designated A in Figure 2, after which the wiper may function in the usual manner. After stopping the motor 6, the wiper 4 may again be supported upon the resilient stem 12 by forcing the wiper 4 upwardly whereby the resilient stem 12 will be forced to the position indicated in dotted lines and designated B in Figure 2 and after the wiper 4 clears the stem 12, the latter will spring back to normal horizontal position, after which the wiper 4 may be rested thereon.

When using the support 7 in connection with a sliding type windshield as illustrated in Figures 4 and 5, wherein the motor 21 is supported on the outer face of the windshield frame 22, the securing bolt 23 for the motor which is located nearest to the operator of the vehicle is removed, passed through the opening 14 in the member 8, and then returned to its original position. The rod 24 for the wiper 25 is supported on the resilient stem 12 in the same manner as the wiper 4 is supported thereon as heretofore described.

In the embodiment illustrated in Figure 7, the support 26 consists of an elongated body portion 27 which is formed at its lower end in the same manner as the body portion 8 of the support 7 is formed at its lower end and has a resilient element 28 secured thereto in the same manner as the resilient element 12 is secured to the member 8. Substantially midway the ends thereof, the member 27 is provided with an elongated opening 29 for the reception therethrough of the bolt 23 when it is desired to apply the support 26 to a windshield of the sliding type illustrated in Figure 4.

Adjacent the upper end thereof, the member 27 is provided with an elongated opening 30 for the reception therethrough of a bolt 31 for the purpose of securing the support 26 in association with a windshield of the swinging type illustrated in Figure 1. The bolt 31 may be passed through a hole in the windshield frame suitably located with respect to the wiper motor and adjustably secured in position by means of the nuts 32 and 33. A lock nut 34 provides a means for locking the bolt in adjusted position and a lock nut 35 provides a means for firmly pressing the member 27 against the outer face of the nut 32.

It is to be noted that the height of the resilient element 28 may be adjusted by means of the elongated openings 29 and 30 when associated with windshields of sliding and swinging types respectively, in order to adapt the support 26 to different types of wipers having different heights of swings. Likewise the resilient element 12 of the support 7 may be adjusted as to height by means of the elongated opening 14 and threaded boss 15 when associated with windshields of sliding and swinging types respectively.

It is thought that the many advantages of a wiper support in accordance with this invention will be readily apparent, and although the preferred embodiment of the invention is as illustrated and described, it is to be understood that changes in the size, shape and arrangement of parts may be resorted to so long as such changes fall within the scope of the invention as defined in the appended claims.

What I claim is:

1. A windshield wiper support comprising, a resilient element for disposition beneath a wiper to support the latter above its normal path of movement, and means for securing said element in position with respect to a windshield, said means including an elongated member adapted to be detachably connected with a windshield and having said resilient element immovably secured thereto.

2. A windshield wiper support comprising, a stationary resilient element for disposition beneath a wiper to support the latter above its normal path of movement, and means for securing said element in position with respect to a windshield, said means including an elongated member adapted to be detachably connected at one end with a windshield and having its other end formed with an angularly disposed portion merging into a spaced, parallel returned portion between which portions one end of said stationary resilient element is clamped.

3. A windshield wiper support comprising, a resilient element for disposition beneath a wiper above its normal path of movement, and means for securing said element in position with respect to a windshield, said means including an elongated member adapted to be detachably connected at one end with a windshield and having its other end formed with an angularly disposed portion merging into a spaced, parallel returned portions, the bend between said portions being formed with an opening, said resilient element being substantially T-shaped and having the stem thereof extending through said opening and having the head thereof clamped between said portions.

In testimony whereof, I affix my signature hereto.

EDMUND H. BURKE.